US009510167B2

(12) United States Patent
Lee

(10) Patent No.: US 9,510,167 B2
(45) Date of Patent: Nov. 29, 2016

(54) ELECTRONIC DEVICE AND METHOD FOR CHANGING ALARM MODE

(71) Applicant: Samsung Electronics Co., Ltd., Gyeonggi-do (KR)

(72) Inventor: Myeong Lo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/752,070

(22) Filed: Jun. 26, 2015

(65) Prior Publication Data
US 2015/0381800 A1  Dec. 31, 2015

(30) Foreign Application Priority Data

Jun. 26, 2014 (KR) .................. 10-2014-0079111

(51) Int. Cl.
*H04M 1/725* (2006.01)
*H04W 4/12* (2009.01)

(52) U.S. Cl.
CPC ........... *H04W 4/12* (2013.01); *H04M 1/72552* (2013.01); *H04M 1/72566* (2013.01)

(58) Field of Classification Search
CPC .................. H04M 1/72522; H04M 1/72597; H04W 4/12
USPC ......... 455/456.1, 550.1, 404.2, 432.1, 412.1, 455/415, 458, 566, 414.1, 418, 567, 414.2; 710/1; 707/769; 340/636.1, 539.11, 340/691.1, 825.49, 539.12; 709/204; 715/835, 769, 764, 771
See application file for complete search history.

(56) References Cited

U.S. PATENT DOCUMENTS

| | | | | |
|---|---|---|---|---|
| 5,960,326 A * | 9/1999 | Kido | ...................... | G08B 5/229 340/7.1 |
| 6,668,177 B2 * | 12/2003 | Salmimaa | ........... | G06F 3/04817 455/456.3 |
| 8,339,259 B1 * | 12/2012 | Biere | ...................... | G06Q 10/10 340/309.16 |
| 8,626,192 B1 | 1/2014 | Simonyi et al. | | |
| 8,768,308 B2 | 7/2014 | Kim et al. | | |
| 2003/0119564 A1 * | 6/2003 | Seok | .................. | H04M 1/72566 455/566 |
| 2004/0054468 A1 * | 3/2004 | Yamada | .................. | G01C 21/36 701/438 |
| 2005/0124388 A1 * | 6/2005 | Seo | ..................... | H04M 19/041 455/566 |
| 2005/0154796 A1 * | 7/2005 | Forsyth | ............. | H04M 1/72522 710/1 |
| 2006/0009234 A1 * | 1/2006 | Freer | ....................... | H04W 4/02 455/456.1 |
| 2006/0073816 A1 * | 4/2006 | Kim | .................. | H04M 1/72544 455/414.1 |
| 2006/0152382 A1 * | 7/2006 | Hiltunen | .................. | G08B 6/00 340/691.1 |
| 2007/0037605 A1 * | 2/2007 | Logan | ................ | G08B 13/1427 455/567 |
| 2007/0058492 A1 * | 3/2007 | Carley | .................... | G04F 1/005 368/109 |

(Continued)

*Primary Examiner* — Tan H Trinh
(74) *Attorney, Agent, or Firm* — The Farrell Law Firm, P.C.

(57) ABSTRACT

An electronic device that includes a control module configured to extract schedule related information from text data, change an alarm mode of the electronic device according to extracted schedule related information and create a triggering message for triggering the change of an alarm mode of at least another electronic device associated with the schedule related information; and a communication interface configured to transmit the triggering message to the at least another electronic device.

18 Claims, 13 Drawing Sheets

(56) References Cited

U.S. PATENT DOCUMENTS

| | | | |
|---|---|---|---|
| 2008/0126991 A1* | 5/2008 | Kang | H04M 1/72566 715/835 |
| 2008/0207274 A1* | 8/2008 | Kim | H04M 1/72544 455/566 |
| 2008/0244005 A1* | 10/2008 | Sengupta | H04L 12/581 709/204 |
| 2008/0253079 A1* | 10/2008 | Robinson | G06F 1/1632 361/679.3 |
| 2009/0143114 A1* | 6/2009 | Vargas | H04W 52/027 455/574 |
| 2010/0144383 A1* | 6/2010 | Berger | G06Q 10/06 455/521 |
| 2010/0330972 A1* | 12/2010 | Angiolillo | H04M 1/274583 455/418 |
| 2011/0076994 A1* | 3/2011 | Kim | G06Q 10/109 455/414.2 |
| 2011/0078174 A1* | 3/2011 | Lee | H04N 5/44543 707/769 |
| 2011/0189977 A1* | 8/2011 | Woen | G06Q 10/109 455/412.1 |
| 2012/0066629 A1* | 3/2012 | Lee | G06F 3/04847 715/769 |
| 2012/0165075 A1* | 6/2012 | Kim | G06F 9/4443 455/566 |
| 2013/0078976 A1* | 3/2013 | Naftolin | H04M 1/72569 455/418 |
| 2013/0218997 A1* | 8/2013 | Kwon | H04W 4/12 709/206 |
| 2013/0273977 A1* | 10/2013 | Kim | H04W 68/02 455/566 |
| 2013/0332721 A1 | 12/2013 | Chaudhri et al. | |
| 2014/0031021 A1 | 1/2014 | Simonyi et al. | |
| 2014/0052797 A1* | 2/2014 | Lessard | H04L 51/18 709/206 |
| 2014/0134983 A1* | 5/2014 | Jung | H04M 3/436 455/414.1 |
| 2014/0194106 A1 | 7/2014 | Simonyi et al. | |
| 2014/0240138 A1* | 8/2014 | Lee | H04M 1/7253 340/636.1 |
| 2014/0294167 A1* | 10/2014 | Kim | H04M 1/72519 379/142.17 |
| 2014/0358411 A1* | 12/2014 | Khoe | G08G 1/13 701/117 |
| 2015/0025930 A1* | 1/2015 | Yang | G06Q 10/1093 705/7.18 |
| 2015/0061862 A1* | 3/2015 | Lee | H04M 1/7253 340/539.11 |
| 2015/0185947 A1* | 7/2015 | Tsai | G06F 3/0488 345/173 |
| 2015/0205567 A1* | 7/2015 | Seo | G06F 3/0484 345/2.3 |

* cited by examiner

ELECTRONIC DEVICE AND METHOD FOR CHANGING ALARM MODE

PRIORITY

This application claims priority under 35 U.S.C. §119(a) to a Korean Patent Application filed on Jun. 26, 2014 in the Korean Intellectual Property Office and assigned Serial No. 10-2014-0079111, the entire contents of which are incorporated herein by reference.

BACKGROUND

1. Field of the Invention

The present invention generally relates to an electronic device and method for analyzing text data on an electronic device, checking a schedule and changing an alarm mode according to the schedule.

2. Description of the Related Art

In general, a user must manipulate an electronic device manually to change the alarm mode of the electronic device in a place such as a theater or an art gallery where he or she must change the alarm mode to a vibration or silence mode from a bell mode.

When an alarm mode must be changed, a typical electronic device inconveniences a user who must change the alarm mode manually as described above.

SUMMARY

The present invention has been made to address the above-mentioned problems and disadvantages and to provide at least the advantages described below.

Accordingly, an aspect of the present invention provides an electronic device and method for analyzing text data included in an electronic device, checking a schedule and changing the alarm mode of the electronic device according to the schedule.

Another aspect of the present invention provides an electronic device and method for changing an alarm mode that changes the alarm mode of an electronic device and provides a message to another electronic device included in a schedule to trigger the change of the alarm mode of the other electronic device.

According to an embodiment of the present invention, an electronic device is provided. The electronic device includes a control module configured to extract schedule related information from text data, change an alarm mode of the electronic device according to extracted schedule related information and creates a triggering message for triggering the change of an alarm mode of at least another electronic device associated with the schedule related information; and a communication interface configured to transmit the triggering message to the at least another electronic device.

According to another embodiment of the present invention, a method of changing an alarm mode is provided. The method includes extracting schedule related information from text data; changing an alarm mode of an electronic device according to the schedule related information; and generating a triggering message for triggering a change of an alarm mode of at least another electronic device included in the schedule related information, and transmitting the triggering message to the at least another electronic device.

According to still another embodiment of the present invention, an electronic device is provided. The device includes a communication interface configured to communicate with another electronic device; and a control module configured to change an alarm mode of the electronic device to be equal to an alarm mode of the other electronic device according to an alarm-mode-change-triggering message received from the another electronic device.

According to an embodiment of the present invention, a method of changing an alarm mode is provided. The method includes receiving an alarm-mode-change-triggering message from another electronic device; and changing an alarm of an electronic device to be equal to an alarm mode of the another electronic device according to the alarm-mode-change-triggering message.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
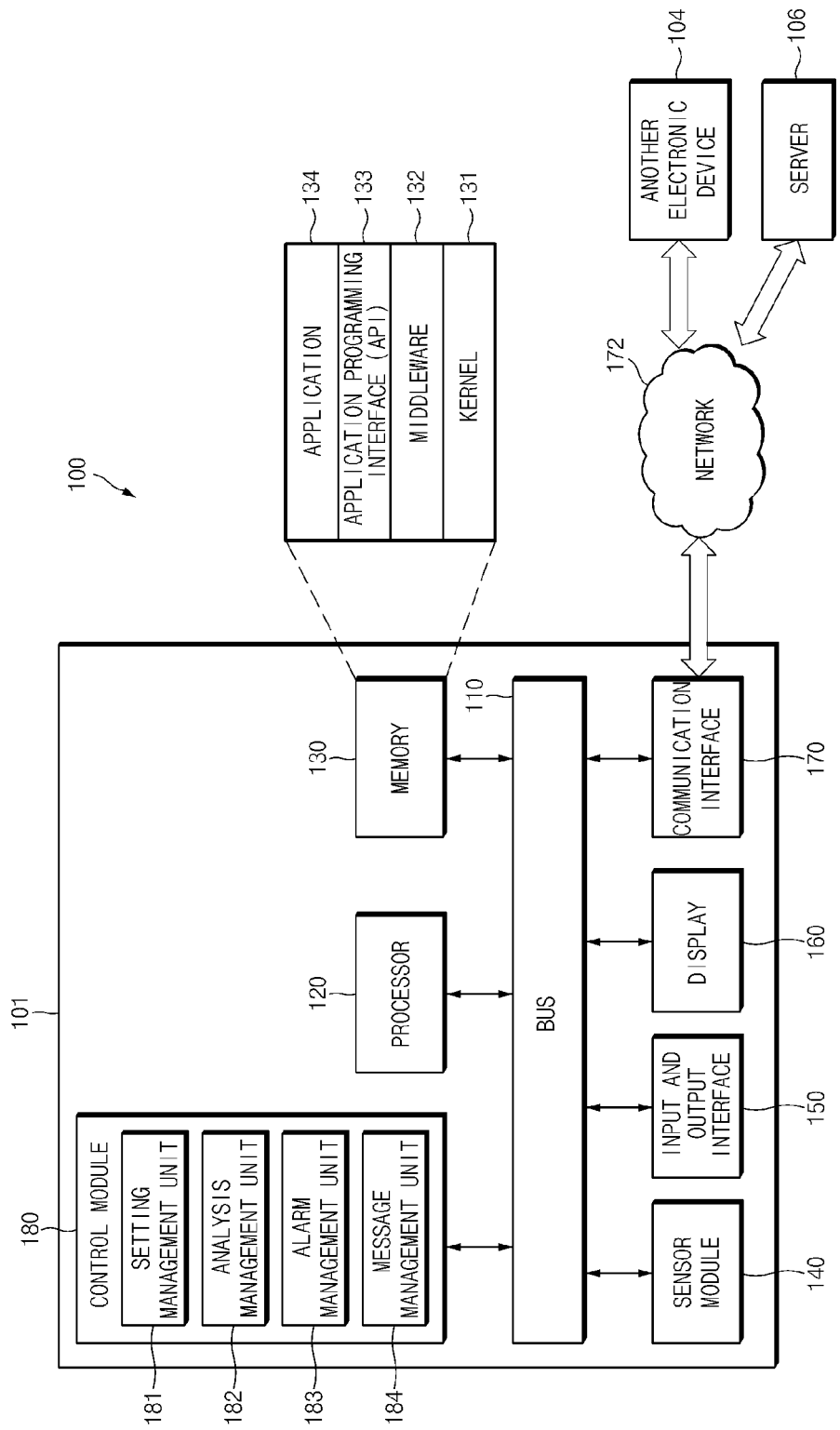
FIG. 1 is a block diagram of an electronic device according to an embodiment of the present invention.

Various embodiments of the present invention are described below in conjunction with the accompanying drawings. Since various embodiments of the present invention may include various modifications and have many embodiments, various embodiments of the present invention are illustrated in the drawings and described herein. However, the present invention is not intended to be limited to the embodiments described herein, and it should be understood that the present invention covers all modifications, equivalents, and/or replacements that fall within the spirit and scope of the present invention. In describing the drawings, similar components are denoted via the use of similar reference numerals.

The expression "include" or "may include" that may be used in describing various embodiments of the present invention indicates the presence of a disclosed corresponding function, operation or component but does not exclude one or more additional functions, operations or components. Furthermore, it should be understood that the term "includes" or "has" in various embodiments of the present invention indicates the presence of characteristics, numbers, steps, operations, components, parts or combinations thereof represented in the present invention but does not exclude the presence or addition of one or more other characteristics, numbers, steps, operations, components, parts or combinations thereof.

The expression "or" in the various embodiments of the present invention includes any and all combinations of words enumerated together with the expression. For example, the expression "A or B" may include A, B, or both A and B.

The expression "a first", "a second", "firstly", or "secondly" in various embodiments of the present invention may modify various components of various embodiments of the present invention but does not limit corresponding components. For example, the expressions above do not limit the order and/or importance of corresponding components. The expressions above may be used to distinguish one component from another component. For example, both a first user device and a second user device are user devices that are mutually different user devices. For example, without departing from the scope of various embodiments of the present invention, a first component may be called a second component and similarly, the second component may also be called the first component.

When any component is referred to as being "connected" to or "accessed" by another component, it should be understood that the former can be "directly connected" to the latter, or there may be another component in between. On the contrary, when any component is referred to as being "directly connected" to or "directly accessed" by another component, it should be understood that there may be no other component in between.

The terms used in various embodiments of the present invention are used only to describe embodiments of the present invention and are not intended to limit the present invention. The terms in singular form include the plural form unless otherwise specified.

Unless otherwise defined herein, all terms used herein including technical or scientific terms have the same meanings as those generally understood by a person skilled in the art to which the various embodiments of the present invention pertain. Terms defined in generally used dictionaries should be construed to have meanings matching contextual meanings in the related art and should not be construed as having an ideal or excessively formal meaning unless otherwise defined in various embodiments of the present invention.

An electronic device according to various embodiments of the present invention may be a device that includes a communication function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an Motion Picture Experts Group Audio Layer 3 (MP3) player, a mobile medical device, a camera, and a wearable device (e.g., a Head-Mounted-Device (HMD) such as electronic glasses, electronic clothing, an electronic bracelet, an electronic necklace, an electronic appcessory, an electronic tattoo, or a smart watch).

According to various embodiments of the present invention, the electronic device may be a smart home appliance having a communication function. The smart home appliance may include, for example, at least one of a TV, a Digital Video Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to various embodiments of the present invention, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigation system, a Global Positioning System (GPS) receiver, an Event Data Recorder (EDR), a Flight Data Recorder (FDR), a car infotainment device, electronic equipment for a ship (e.g., a navigation device or gyro compass for a ship), avionics, a security device, a head unit for a vehicle, an industrial or home robot, a financial institution's Automated Teller Machine (ATM) or a store's Point Of Sale (POS) device. According to various embodiments of the present invention, the electronic device may include at least one of a portion of a building/structure or furniture including a communication function, an electronic board, an electronic signature receiving device, a projector, and various measurement devices (e.g., a water, electricity, gas or electric wave measurement device). An electronic device according to various embodiments of the present invention may be one of the above-described various devices or combinations of two or more of the above-described various devices. Moreover, an electronic device according to various embodiments of the present invention may be a flexible device. Moreover, it is obvious to a person skilled in the art that electronic devices according to various embodiments of the present invention are not limited to the above-described devices.

In the following, electronic devices according to various embodiments of the present invention are discussed with reference to the accompanying drawings. The term "user" used in various embodiments may indicate a person who uses an electronic device, or a device (e.g., an artificial-intelligence electronic device) that uses the electronic device.

FIG. 1 is a block diagram of an electronic device 101 according to an embodiment of the present invention.

Referring to FIG. 1, an electronic device 101 in a network environment 100 according to an embodiment of the present invention includes a bus 110, a processor 120, a memory 130, a sensor module 140, an input and output interface 150, a display 160, a communication interface 170, and a control module 180. The electronic device 101 extracts schedule related information from text data and changes an alarm mode according to the extracted schedule related information. The electronic device 101 creates a triggering message for triggering the change of the alarm mode of another electronic device 104 associated with the schedule related information. The electronic device 101 transmits the triggering message to the other electronic device 104.

The bus 110 is a circuit that connects the above-described components mutually and transfers communication (e.g., a control message) between the above-described components.

The processor 120 receives a command from the above-described components (e.g., the memory 130, the sensor module 140, the input and output interface 150, the display 160, the communication interface 170 and the control module 180) through the bus 110, decrypts a received command and performs a calculation or data processing according to a decrypted command, for example.

The memory 130 stores a command or data received from the processor 120 or other components (e.g., the sensor module 140, the input and output interface 150, the display 160, the communication interface 170 and the control module 180) or generated by the processor 120 or other components. The memory 130 includes programming modules such as a kernel 131, middleware 132, an Application Programming Interface (API) 133 or an application 134. Each of the above-described programming modules may be configured in software, firmware, hardware or a combination of two or more thereof. The memory 130 stores an alarm mode change application that is received from an external device such as a server 106. The memory 130 stores text data. The text data may be included in a text message, a chatting message and an e-mail message transmitted and received by using an application that enables message transmission and reception to and from the external device (e.g., the other electronic device 104 or the server 106). The text data may be included in data input from a user by using an application that may input the data. The memory 130 may store information on the other electronic device 104. Information on the other electronic device 104 may include a telephone number, a chatting IDentifier (ID), and an e-mail address. The text data may be generated in such a manner that a text image on image data included in the text message, the chatting message, the e-mail message and the data is converted by an Optical Character Reader (OCR). To this end, the memory 130 may store an OCR conversion program.

The kernel 131 controls or manages system resources (e.g., the bus 110, the processor 120 or the memory 130) used for performing an operation or function implemented in other remaining programming modules such as middleware 132, an API 133, or an application 134. Also, the kernel 131 provides an interface that enables the middleware 132, the API 133 or the application 134 to access and control or manage the separate components of the electronic device 101.

The middleware 132 acts as a go-between so that the API 133 or the application 134 may communicate with the kernel 131 to transmit and receive data. Also, the middleware 132 may use, for example, a method of allocating priority for using the system resource (e.g., the bus 110, the processor 120 or the memory 130) of the electronic device 101 to at least one of applications 134 to control (e.g., schedule or load balance) task requests received from the application 134.

The API 133 is an interface for enabling the application 134 to control a function provided from the kernel 131 or the middleware 132 and may include at least one interface or function (e.g., a command) for a file control, a window control, image processing or a text control.

The sensor module 140 may include a Global Positioning System (GPS) sensor for checking location information on the electronic device 101, an illumination sensor for measuring an illumination level outside the electronic device 101, and a microphone for measuring a decibel level outside the electronic device 101. The sensor module 140 provides the control module 180 with external environment information including the location information on the electronic device 101, the illumination level and the decibel level that have been checked.

The input and output interface 150 transfers a command or data input from a user via an input and output device (e.g., a sensor, a keyboard or a touch screen) to the processor 120, the memory 130, the communication interface 170 or the control module 180 via the bus 110. The input and output interface 150 may provide the processor 120 with data on a user touch input through a touch screen. The input and output interface 150 outputs, through the input and output device (e.g., a speaker or a display), a command or data received from the processor 120, the memory 130, the communication interface 170, or the control module 180 through the bus 110.

The display 160 provides a user with various pieces of information. For example, the display 160 may display various screens that operate according to the control module 180. The display 160 may be configured as a liquid crystal display (LCD) or a touch screen.

The communication interface 170 establishes communication between the electronic device 101 and an external device (e.g., the other electronic device 104 or the server 106). For example, the communication interface 170 may connect to a network 172 via wireless or wired communication to communicate with an external device. The wired communication may include at least one of a Universal Serial Bus (USB), High Definition Multimedia Interface (HDMI), Recommended Standard 232 (RS-232) or Plain Old Telephone Service (POTS) scheme. The wireless communication may include at least one of a Wireless Fidelity (WiFi), Bluetooth (BT), Near Field Communication (NFC) or cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro) or Global System Mobile (GSM)) scheme, for example.

According to an embodiment of the present invention, the network 172 is a telecommunication network. The telecommunication network may include at least one of a computer network, the Internet, the Internet of Things or a telephone network. According to an embodiment of the present invention, a protocol (e.g., a transport layer protocol, a data link layer protocol or a physical layer protocol) for communication between the electronic device 101 and an external device may be supported by at least one of the application 134, the application program interface 133, the middleware 132, the kernel 131 or the communication interface 170.

The control module 180 extracts schedule related information from text data and changes an alarm mode according to the extracted schedule related information. The control module 180 creates a triggering message for triggering the change of the alarm mode of another electronic device 104 associated with the schedule related information and transmits the message to the other electronic device 104. To this end, the control unit 180 includes a setting management unit 181, an analysis management unit 182, an alarm management unit 183, and a message management unit 184.

The setting management unit 181 sets an alarm mode change condition according to a user input. The setting management unit 181 executes an application for changing an alarm mode according to a user input or automatically executes the application when the electronic device 101 is powered on.

According to an embodiment of the present invention, the setting management unit 181 sets any one of the automatic change of the alarm mode, a change after a user check and no change, upon the arrival of a schedule generated from text data, according to a user input. The setting management unit 181 may set at least one reference word that is the parsing criterion of text data, according to a user input. The setting management 181 may set an application for setting text data among applications installed in the electronic device 101, according to a user input. In this case, the application may include a text message application, a chatting message application or an e-mail application that may transmit a message to, and receive from, the other electronic device 104, and may include a scheduler, a diary and a note pad which may input data.

When an application set by the setting management unit 181 is an application that may transmit and receive a message, the analysis management unit 182 monitors the application when a message is transmitted and received. When an application set by the setting management unit 181 is an application that inputs data, the analysis management unit 182 monitors the application when data is input or regularly.

According to an embodiment of the present invention, the analysis management unit 182 monitors the message transmitted to, and received from, the other electronic device 104 by the application capable of transmitting and receiving a message to check whether reference words set by the setting management unit 181 are included. When the message includes the reference words, the analysis management unit 182 parses the message transmitted to, and received from, the other electronic device 104 to extract schedule related information. The schedule related information may be related to a time, a date and a place. The analysis management unit 182 discerns a word representing a time such as "3 o'clock" or "three o'clock" from the message. The analysis management unit 182 discerns a word representing a date such as "tomorrow" or "25th" from the message. The analysis management unit 182 discerns a word representing a place such as "Seoul Theater" or "National Gallery" from the message. When the memory 130 stores the name of a place, the analysis management unit 182 extracts the same name as that of the place stored in the message. The analysis management unit 182 checks information, such as a telephone number, chatting ID, and mail address, of the other electronic device 104 that transmits and receives a message. When the electronic device 101 performs group message transmission and reception with a plurality of other electronic devices, the analysis management unit 182 checks information on the other electronic devices. The analysis management unit 182 may generate a new schedule from checked schedule related information.

According to an embodiment of the present invention, the analysis management unit 182 monitors data input or stored by an application capable of inputting data to check whether reference words set by the setting management unit 181 are included. When the data includes reference words, the analysis management unit 182 parses the data to extract schedule related information. The analysis management unit 182 checks the tagging of the electronic device 104 when the data is input or stored. The analysis management unit 182 checks information on the electronic device 104. When the other electronic devices are tagged, the analysis management unit 182 checks information on the other electronic devices. The analysis management unit 182 may generate a new schedule from input or stored data.

When a schedule checked by the analysis management unit 182 arrives, the alarm management unit 183 selectively performs the change of an alarm mode by the alarm mode change condition set by the setting management unit 181. When the alarm mode change condition is set so that the alarm mode is automatically changed when a schedule arrives, the alarm management unit 183 automatically changes the alarm mode when the schedule arrives. When the alarm mode change condition is set so that the alarm mode is changed after a user check when a schedule arrives, the alarm management unit 183 may pop up a message related to the change of the alarm mode on the display 160 when the schedule arrives. The alarm management unit 183 may change the alarm mode by user selection. The alarm mode change condition is set so that the alarm mode is not changed even though the schedule arrives, and the alarm management unit 183 may maintain the current alarm mode even though the schedule arrives.

According to an embodiment of the present invention, when a schedule checked by the analysis management unit 182 arrives, the alarm management unit 183 activates the sensor module 140 and checks the current location of the electronic device 101. When schedule related information includes place information, the alarm management unit 183 compares the current location checked with the place information. The alarm management unit 183 may change the alarm mode when the current location is equal, or similar, to the place information.

When the schedule checked by the analysis management unit 182 arrives, the message management unit 184 creates a triggering message for triggering the change of the alarm mode of the other electronic device 104 so that the alarm mode is equal to that of the electronic device 101.

After changing the alarm mode according to a schedule, the alarm management unit 183, in real time or regularly, checks external environment information provided from the sensor module 140. The alarm management unit 183 returns to the alarm mode before the change, when external environment information provided from the sensor module 140 changes to a value equal to or greater than a critical value. For example, the alarm management unit 183 returns to the alarm mode before the change, when the illumination level among the external environment information, after the change of the alarm mode according to a schedule, changes from 50 Lux (Lx) to 200 Lx checked after a certain time elapses. The alarm management unit 183 returns to the alarm mode before the change when the electronic device 101 departs from a location equal, or similar, to the location checked from schedule related information.

According to an embodiment, the control module 180 of the electronic device 101 extract schedule related information from text data and changes an alarm mode according to the extracted schedule related information. The control module 180 creates a triggering message for triggering the change of the alarm mode of at least one electronic device 104 associated with the schedule related information. The communication interface 170 of the electronic device 101 may transmit a triggering message to at least one electronic device 104. In this case, the schedule related information may include date information, time information and place information.

The control module 180 checks state information that includes the current date, the current time and the current location. The control module 180 change the alarm mode when the current data is equal to the date information, the current time is equal to the time information or within a critical time, and the current location is equal to the place information or within a critical range.

The control module 180 extract schedule related information from a message that is transmitted and received to and from the at least one electronic device 104 through a chatting application, a message application and an e-mail application. The control module 180 checks information on the at least one electronic device 104.

The control module 180 extracts the schedule related information from data input through applications including a scheduler, diary and note pad. The control module 180 checks information on the at least one electronic device 104 tagged to the data.

The electronic device 101 further includes the sensing module 140 that senses external environment information including location information, an illumination level and a decibel level. The control module 180 returns to the previous alarm mode according to external environment information after the change of the alarm mode.

According to an embodiment of the present invention, the communication interface 170 of the electronic device 101 establishes communication with the other electronic device 104, and the control module 180 changes the alarm mode of the electronic device 101 to be equal to the alarm mode of the other electronic device 104 according to an alarm mode change triggering message received from the other electronic device 104.

Figure 2:
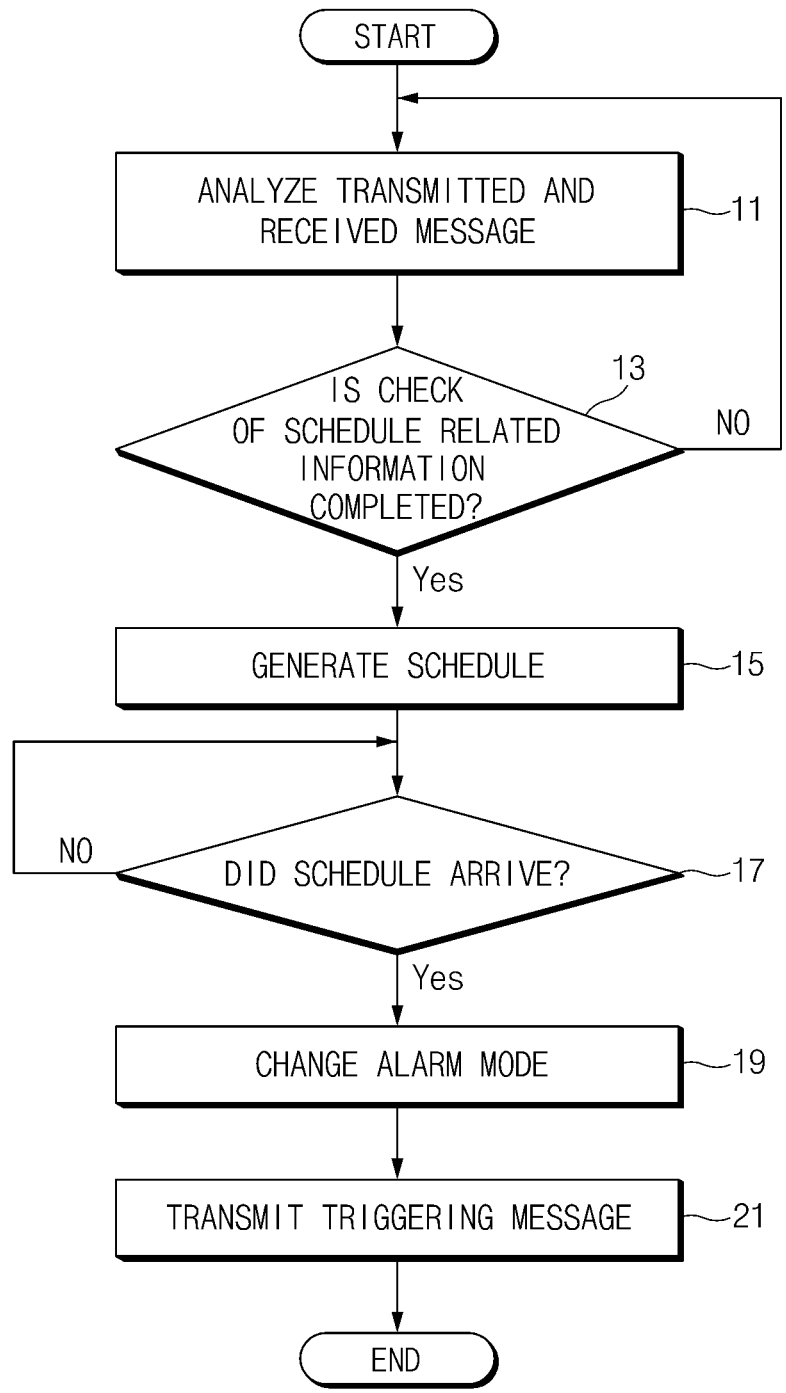
FIG. 2 is a flowchart of a method of setting a change of an alarm mode via a message according to an embodiment of the present invention.

FIG. 2 is a flowchart of a method of setting a change of an alarm mode via a message according to an embodiment of the present invention.

Referring to FIGS. 1 and 2, the control module 180 executes an application for changing an alarm mode according to a user input or automatically when the electronic device 101 is powered-on. In step 11, the control module 180 parses a message that is transmitted to, and received from, the other electronic device 104 through the application. The control module 180 parses the message based on various conditions set in order to change an alarm mode according to a schedule. For example, the control module 180 may set any one of an automatic change of an alarm mode, a change after a user check, and no change, upon the arrival of a schedule checked from a transmitted/received message, according to a user selection. The control module 180 may parse the transmitted/received message to set at least one reference word that is a criterion for generating a schedule. The control module 180 sets an application for generating a schedule for message parsing among applications that enables message transmission to, and reception from, the other electronic device 104. For example, the application that enables the message transmission and reception may include a message application, a chatting application or an e-mail application. The control module 180 sets whether to change an alarm mode according to the alarm mode of the other electronic device 104 upon the reception of an alarm mode change triggering message from the other electronic device 104.

The control module 180 monitors the message transmitted to, and received, from the other electronic device 104 using at least one application set as a condition for changing an alarm mode. When there is a reference word in the message as a result of monitoring, the control module 180 parses the message. In this case, the message transmitted to, and received from, the other electronic device 104 may include a text message, a chatting message, and an e-mail message. The control module 180 extracts schedule related information from the message parsed. The schedule related information may be related to a time, a date and a place, and the control module 180 may check information on the telephone number, chatting ID or mail address of the other electronic device 104 that transmits and receives a message. For example, when a theater and an opera are set as reference words, the control module 180 checks whether a transmitted and received message includes at least one of the words.

When the transmitted and received message includes at least one reference word, the control module 180 parses the message to extract a time, a date and a place as schedule related information.

The control module 180 performs step 15 when, in step 13, the check of schedule related information including a time, a date and a place is completed. The control module 180 returns to step 11 and continues to parse a message transmitted to, and received from, the other electronic device 104 when, in step 13, the check of schedule related information is not completed.

In step 15, the control module 180 generates a schedule for a user of the electronic device 101 with schedule related information on which the check has been completed. The control module 180 may add a generated schedule to an application such as a scheduler, a diary or a note pad.

In step 17, the control module 180 performs step 19 upon the arrival of the generated schedule such as a date and time related to schedule related information. Until the generated schedule arrives in step 17, the control module 180 continues to perform step 17 to check for the arrival of the schedule. The control module 180 may further check whether the location of the electronic device 101 checked by the sensor module 140 is equal, or similar, to the place included in the schedule related information, when the generated schedule arrives. The control module 180 performs step 19 when the place included in the schedule related information is equal, or similar, to the location of the electronic device 101.

In step 19, the control module 180 changes a preset alarm mode. According to an embodiment of the present invention, when a user sets an alarm mode so the alarm mode is changed to a vibration mode or a silence mode, the control module 180 changes the alarm mode to the vibration mode or the silence mode.

In step 21, the control module 180 creates an alarm mode change triggering message and transmits it to the other electronic device 104 so that the alarm mode of the other electronic device 104 is changed to the same alarm mode as the changed alarm mode of the electronic device 101.

Figure 3:
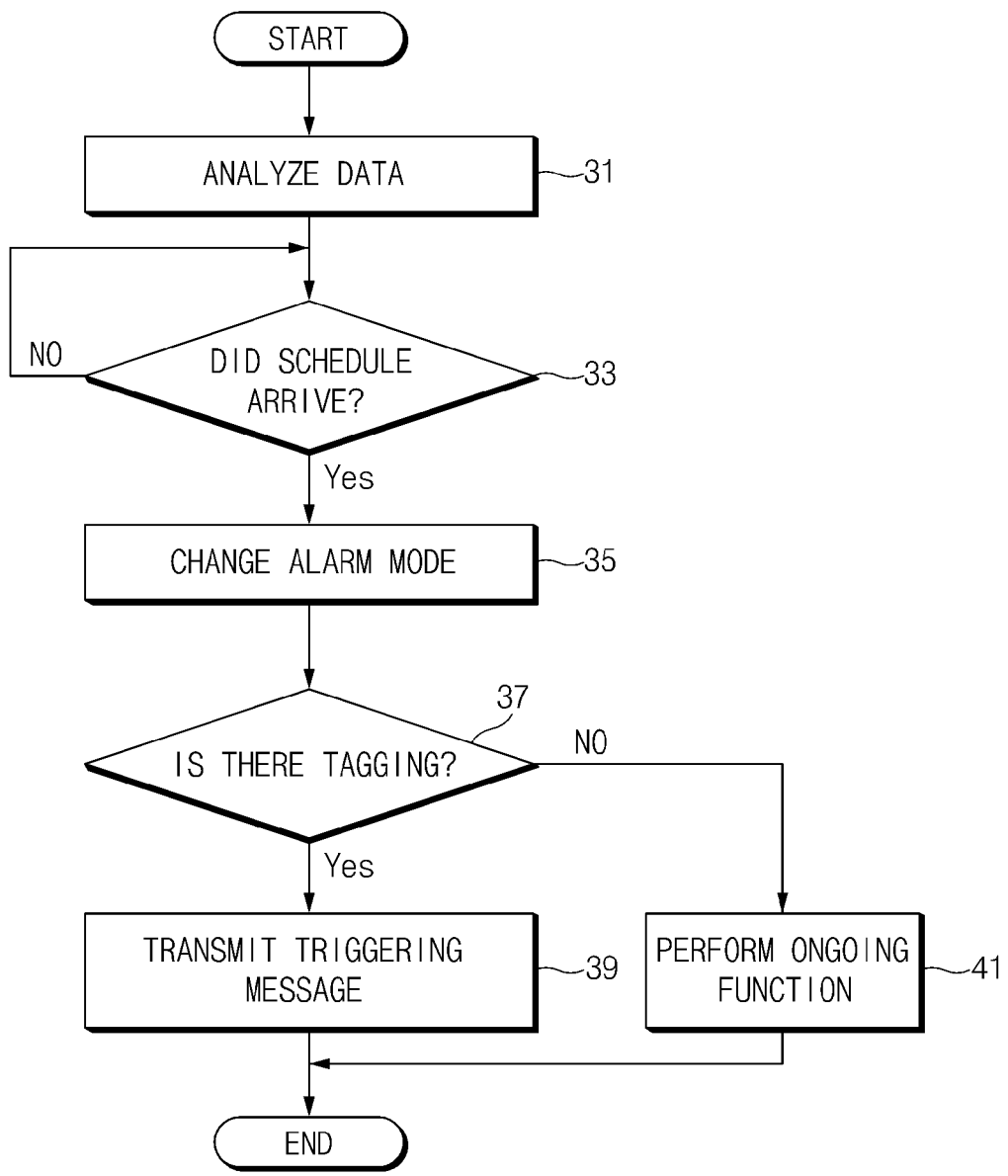
FIG. 3 is a flowchart of a method of setting a change of an alarm mode via a scheduler according to an embodiment of the present invention.

FIG. 3 is a flowchart of a method of setting a change of an alarm mode via a scheduler according to an embodiment of the present invention.

Referring to FIGS. 1 and 3, the control module 180 monitors data input or stored by an application capable of inputting data in step 31. In this case, the application may be a scheduler, a diary or a note pad. The control module 180 checks for schedule related information in the data. In this case, the schedule related information may include a time, a date and a place. For example, when a theater and an opera are set as reference words, the control module 180 checks whether the data includes at least one of the words. The control module 180 parses the data to extract schedule related information when the data includes at least one reference word. The control module 180 may generate schedule based on extracted schedule related information.

In step 33, the control module 180 may perform step 35 upon the arrival of the generated schedule such as a date and time related to schedule related information. Until the generated schedule arrives in step 33, the control module 180 continues to perform step 33 to check for the schedule to arrive. In this case, the control module 180 may further check whether the location of the electronic device 101 checked by the sensor module 140 is equal, or similar, to the place included in the schedule related information, when the generated schedule arrives. The control module 180 may perform operation 35 when the place included in the schedule related information is equal, or similar, to the location of the electronic device 101.

In step 35, the control module 180 changes a preset alarm mode. According to an embodiment of the present invention, when a user sets an alarm mode so the alarm mode is changed to a vibration mode or a silence mode, the control module 180 changes the alarm mode to the vibration mode or the silence mode.

In step 37, the control module 180 checks the tagging of the other electronic device to data. When there is the tagging of the other electronic device 104 to the data as a result of checking in step 37, the control module 180 performs step 39. According to an embodiment of the present invention, the control module 180 checks whether the data includes information on the other electronic device 104 such as a telephone number, an e-mail address, or a chatting ID. The information on the other electronic device 104 may be selected among pieces of information stored in a phone book and may be input by a user. In step 39, the control module 180 creates a message and transmits it to the other electronic device 104 so that the alarm mode of the other electronic device 104 is changed to the same alarm mode as the changed alarm mode of the electronic device 101. The control module 180 transmits a message based on information on the other electronic device 104 included in the data, such as an alarm mode change triggering message, to the other electronic device 104.

When there is no tagging of the other electronic device 104 to the data as a result of checking in step 37, the control module 180 performs step 41. In step 41, the control module 180 continues to perform an ongoing function.

Figure 4:
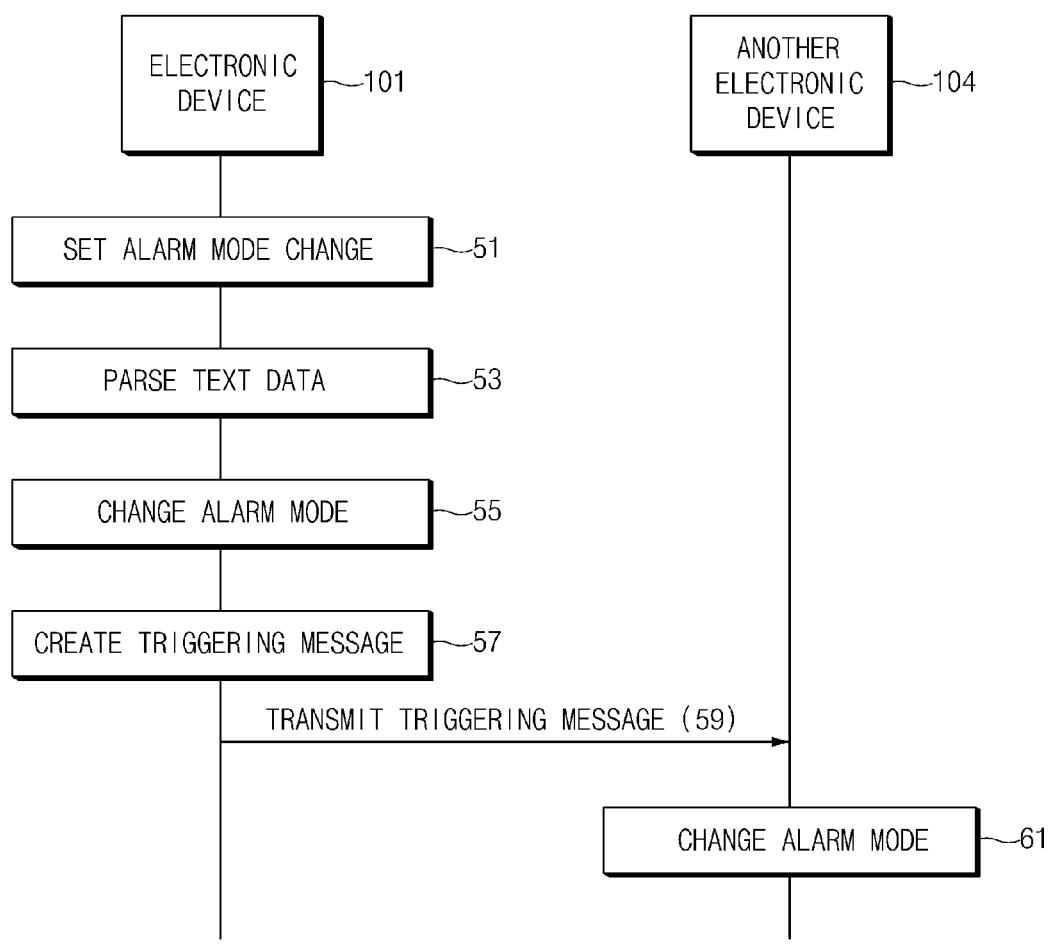
FIG. 4 is a flowchart of a method of transmitting, by an electronic device, a message triggering a change of an alarm mode to another electronic device according to an embodiment of the present invention.

FIG. 4 is a flowchart of a method of transmitting, by an electronic device, a message triggering a change of an alarm mode to another electronic device according to an embodiment of the present invention.

Referring to FIGS. 1 and 4, the electronic device 101 sets various conditions for changing an alarm mode based on a user selection in step 51. For example, the control module 101 may set any one of a automatic change of an alarm mode, a change after a user check and no change, upon the arrival of a schedule checked from text data, according to a user selection. The electronic device 101 sets at least one reference word that is a criterion for generating a schedule from the text data. In this case, the reference word may be a parsing criterion of the text data. The electronic device 101 sets an application for generating a schedule through the monitoring of the text data. The application may include a message application, a chatting application, and an e-mail application that enable message transmission to and reception form the other electronic device 104, and may include a scheduler application, a diary application and a note pad application which may input and store the data. The electronic device 101 sets whether to change an alarm mode according to the alarm mode of the other electronic device 104 upon the reception of an alarm mode change triggering message from the other electronic device 104.

In step 53, the electronic device 101 parses text data included in at least one application that has been set. For example, the electronic device 101 may monitor the text data included in the at least one application set in step 51 and parse the text data when there is a set reference word. The electronic device 101 parses the text data to extract schedule related information. For example, when a set reference word is "theater" and the text data includes "theater", the electronic device 101 checks the schedule related information including a time, a date and a place from the text data. The electronic device 101 checks information on the other electronic device 104 that transmits to, and receives a message from, the electronic device 101, when the text data is at least one of a text message, a chatting message and an e-mail message. The electronic device 101 checks the information on the other electronic device 104 tagged to the data, when the text data is data that is input or stored by an application such as a scheduler, a diary or a note pad. Information on the electronic device 104 may include the telephone number, chatting identifier (ID), and e-mail address of the other electronic device 104. The information on the other electronic device 104 may be information preset to the electronic device 101 or information input by a user.

In step 55, the electronic device 101 changes an alarm mode upon the arrival of a time or a date checked from schedule related information irrespective of a schedule checked in step 53, such as a place. According to an embodiment of the present invention, the electronic device 101 may change an alarm mode, when a date or a time checked from schedule related information arrives and the electronic device 101 is located at the same, or similar, location to that checked from the schedule related information.

In step 57, the electronic device 101 creates a message triggering the change of the alarm mode of the other electronic device 104. For example, the electronic device 101 may create a triggering message that changes the alarm mode of the other electronic device 104 to the same alarm mode as the changed alarm mode of the electronic device 101. In step 59, the electronic device 101 transmits a created triggering message to the other electronic device 104. The electronic device 101 transmits the created message based on information on the other electronic device 104 transmitting and receiving a message or the information on the other electronic device 104 tagged to data.

In step 61, the other electronic device 104 changes to the same alarm mode as the changed alarm mode of the electronic device 101 based on a received message.

According to an embodiment of the present invention, a method of changing an alarm mode by the electronic device 101 includes extracting schedule related information from text data, changing an alarm mode according to the schedule related information, and creating a triggering message for triggering the change of the alarm mode of at least one electronic device 104 included in the schedule related information to transmit the message to the at least one electronic device 104.

The step of extracting the schedule related information may include extracting the schedule related information from a message that is transmitted to, and received from, the at least one electronic device 104 through a chatting application, a message application and an e-mail application. The operation of extracting the schedule related information may further include checking information on the at least one electronic device 104 that transmits and receives the message.

The step of extracting the schedule related information may include extracting the schedule related information from data input through applications that includes a scheduler, a diary and a note pad. The step of extracting the schedule related information may further include checking information on the at least one electronic device 104 that is tagged to the data.

Subsequent to generating the triggering message to transmit the message to the at least one electronic device 104, it is possible to further include a step of sensing external environment information including location information, an illumination level, and a decibel level and a step of returning to the previous alarm mode according to the external environment information.

According to an embodiment of the present invention, a method of changing an alarm mode by the electronic device 101 includes an operation of receiving an alarm mode change triggering message from the other electronic device 104, and an operation of changing the alarm mode to be equal to the alarm mode of the other electronic device 104 according to the alarm mode change triggering message.

Figure 5:
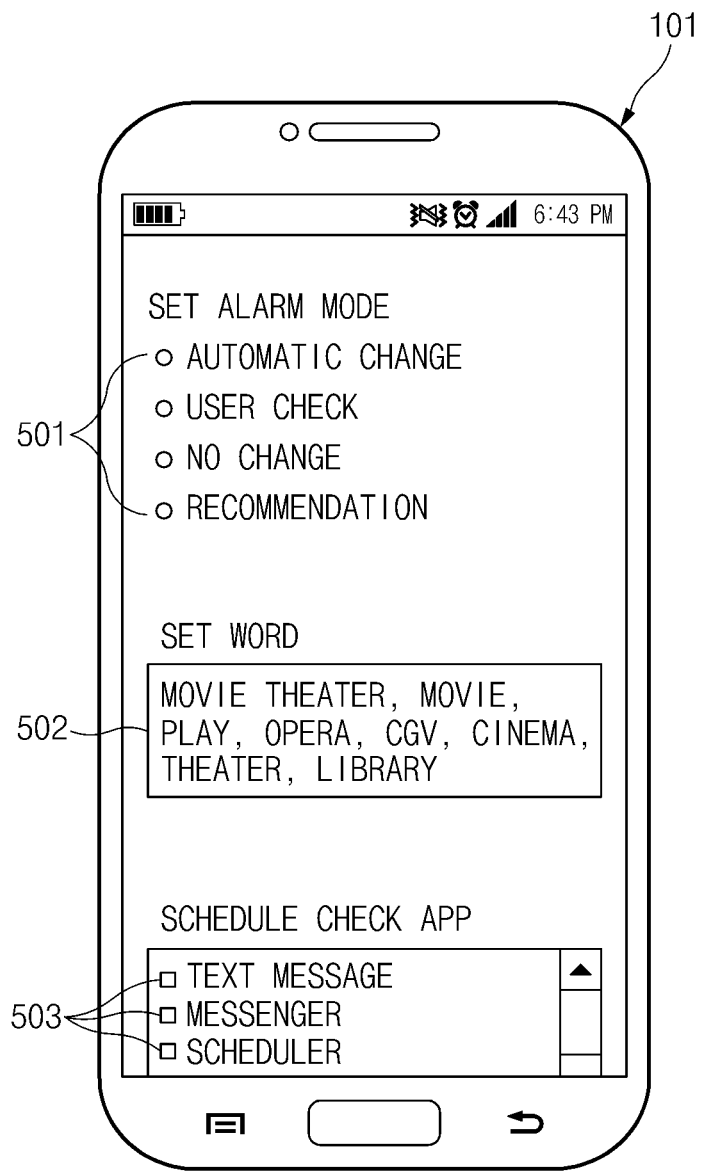
FIG. 5 is a screen showing a method of setting a change of an alarm mode according to an embodiment of the present invention.

FIG. 5 is a screen showing a method of setting a change of an alarm mode according to an embodiment of the present invention.

Referring to FIGS. 1 and 5, when a user executes an application for changing an alarm mode based on text data, an execution screen as shown in FIG. 5 is displayed on the display 160 of the electronic device 101. A user may select any one of items from an alarm mode setting menu 501. The electronic device 101 may automatically change an alarm mode upon the arrival of a schedule generated text data, when an automatic change item is selected from the "SET ALARM MODE" menu 501. The electronic device 101 displays a pop up message for checking whether to change the alarm mode on the display 160 upon the arrival of the schedule, when a user check item is selected from the "SET ALARM MODE" menu 501. The electronic device 101 does not change the alarm mode even though the schedule arrives, when "NO CHANGE" is selected from the "SET ALARM MODE" menu 501. When a recommendation item is selected from the "SET ALARM MODE" menu 501, the electronic device 101 changes to the same alarm mode as that of the other electronic device 104 according to an alarm mode change triggering message when the alarm mode change triggering message is received from the other electronic device 104.

The electronic device 101 stores at least one reference word input to a "SET WORD" menu 502 by a user. The electronic device 101. generates a schedule from text data when the word is discerned from text data on at least one application. The electronic device 101 may set at least one application according to a user selection from a "SCHEDULE CHECK APP" menu 503. In this case, the "SCHEDULE CHECK APP" may include a message application enabling text message transmission and reception, a chatting application enabling chatting message transmission and reception, and an e-mail application enabling e-mail message transmission and reception, and may be an application that enables data to be input and stored, such as a scheduler, a diary, and a note pad. For example, when a messenger (e.g. a chatting application) is selected from the "SCHEDULE CHECK APP" menu 503, the electronic device 101 parses a chatting message transmitted to, and received from, the other electronic device 104 through the messenger.

Figure 6A:
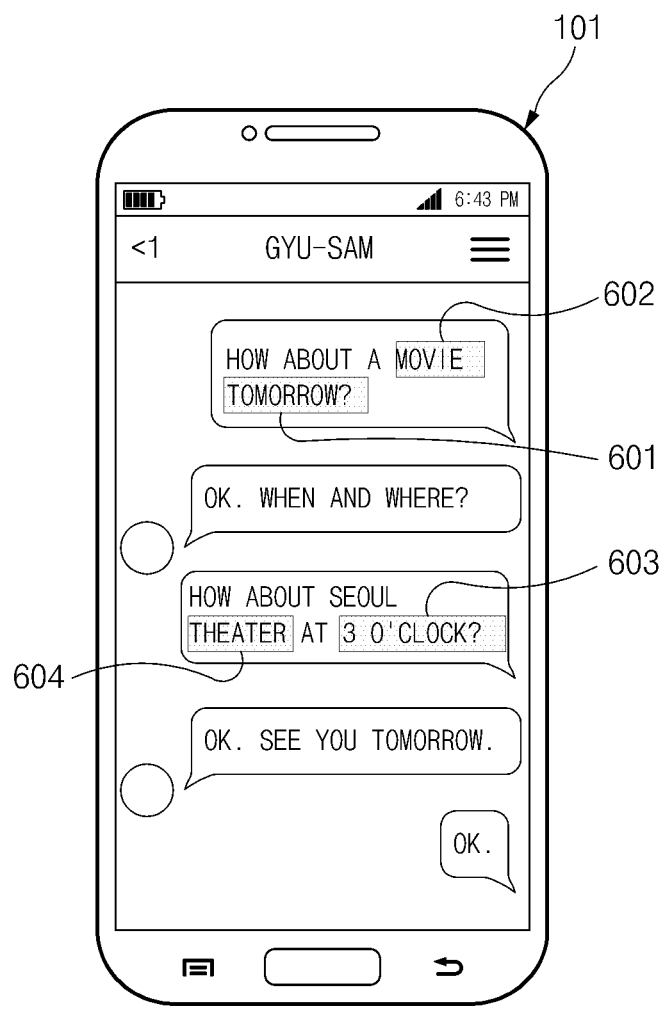
FIGS. 6A and 6B are screens showing a method of generating a schedule through a chatting message according to an embodiment of the present invention.
Figure 6B:
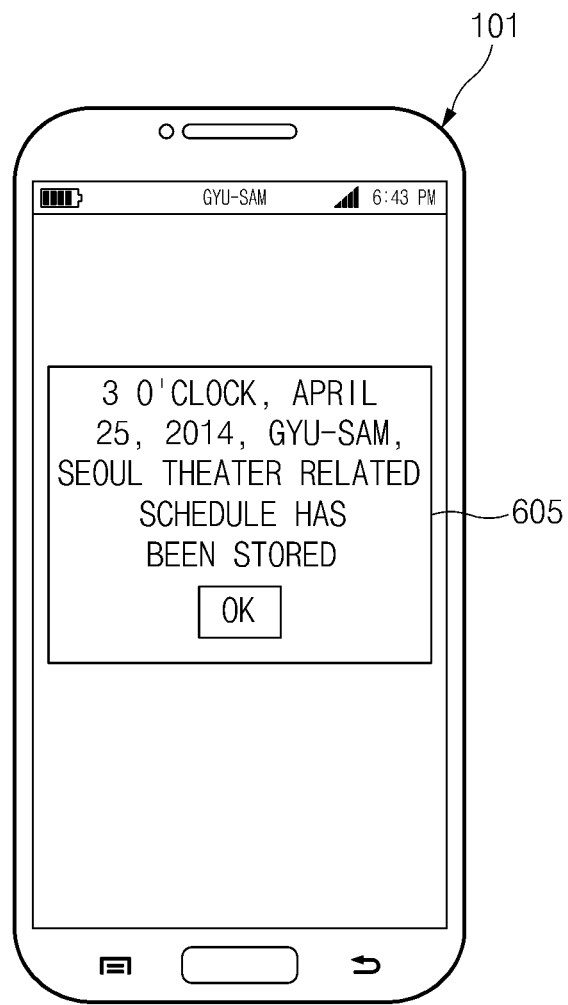

FIGS. 6A and 6B are screens showing a method of generating a schedule through a chatting message according to an embodiment of the present invention.

Referring to FIGS. 1, 5, 6A, and 6B, words and mnemonics such as "movie theater," "movie," "play," "opera," "CGV," "cinema," "theater," and "library" may be set as reference words on a setting screen such as FIG. 5 and the messenger (e.g. a chatting application) may be set as a "SCHEDULE CHECK APP". According to an embodiment of the present invention, a screen on which a user chats with a user "GYU-SAM" of the other electronic device 104 through the messenger may be displayed as shown in FIG. 6A. The electronic device 101 monitors a chatting message transmitted to, and received form, the other electronic device 104 as shown in FIG. 6A.

The electronic device 101 parses a chatting message including at least one of set reference words to extract schedule related information. For example, the electronic device 101 may detect words "MOVIE" 601 and "THEATER" 604 that are the same words as the reference words set by the "SET WORD" menu 502 in FIG. 5 as a result of monitoring the chatting message. The electronic device 101 may extract date related words such as "TOMORROW" 602 and a time related word such as "3 O'CLOCK", from the chatting message when the same word as the set reference word is detected. The electronic device 101 may extract a name of "SEOUL THEATER" from the chatting message to use it as a place related word. To this end, the electronic device 101 stores the names of a building and a store according to a user input.

The electronic device 101 checks a date when the chatting message is transmitted and received. The electronic device 101 may check a date of "2014/04/25" based on a checked date and an extracted word "TOMORROW" when it is checked that the transmission and reception date of the chatting message is "2014/04/24." The electronic device 101 discerns information on the other electronic device 104 from the chatting ID of the other electronic device 104 transmitting and receiving the chatting message and from the telephone number of the other electronic device 104. In this case, the information on the other electronic device 104 may be information stored in the phone book of the electronic device 101 or information additionally input by a user.

The electronic device 101 uses extracted words to generate a schedule related to a user of the other electronic device 104. The electronic device 101 displays a popup message 605 as shown in FIG. 6B as generated schedule related information. Information on a generated schedule, such as a date, a time, name of a user of the other electronic device 104 and a place may be displayed on the popup message 605.

Figure 7:
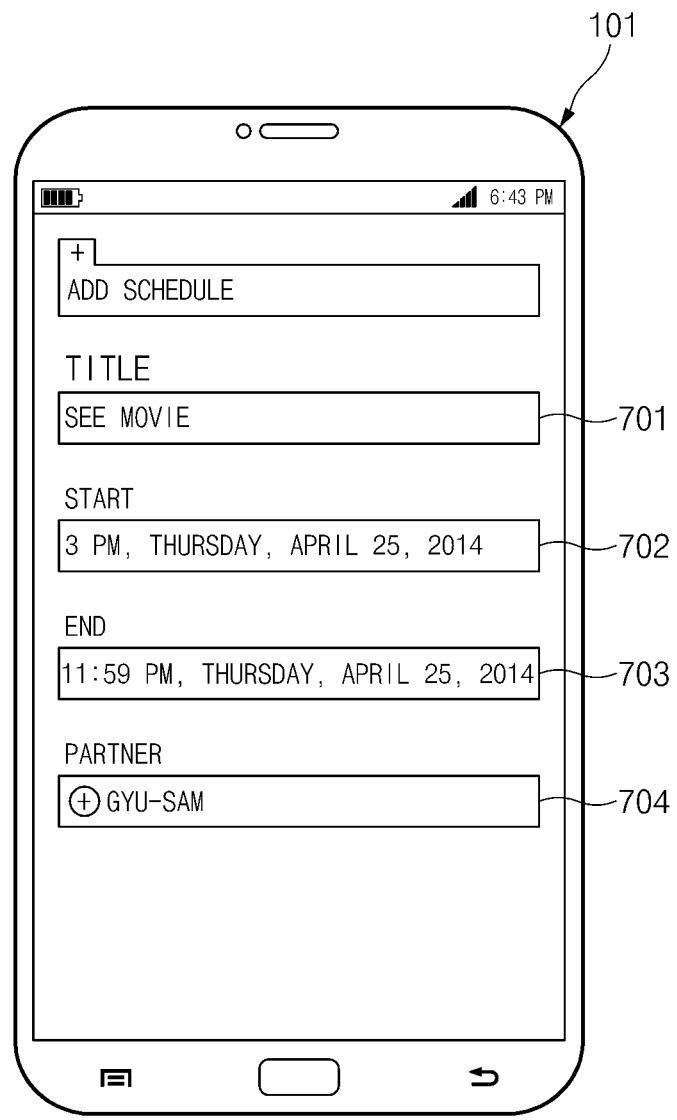
FIG. 7 is a screen showing a method of generating a schedule through a scheduler according to an embodiment of the present invention.

FIG. 7 is a screen showing a method of generating a schedule through a scheduler according to an embodiment of the present invention.

Referring to FIGS. 1 and 7, when a user executes a scheduler application for generating a schedule, an execution screen as shown in FIG. 7 is displayed on the display 160 of the electronic device 101. A user may input the "TITLE" 701 of a schedule and a "START" 702 at which date and time the schedule starts. The user may input an "END" 703 at which date and time the schedule ends, and may tag a "PARTNER" 704. The user may select the name of a user of the other electronic device 104 pre-stored in the phone book of the electronic device 101 to tag user name "GYU-SAM" to the schedule as a "PARTNER" 704.

The user may tag another user to a schedule by adding information on another user to a region to which a "PARTNER" 704 is tagged, when information on the telephone number, e-mail address, or chatting ID of the other user to be tagged has not been stored in the electronic device 101 such as a phone book.

Figure 8A:
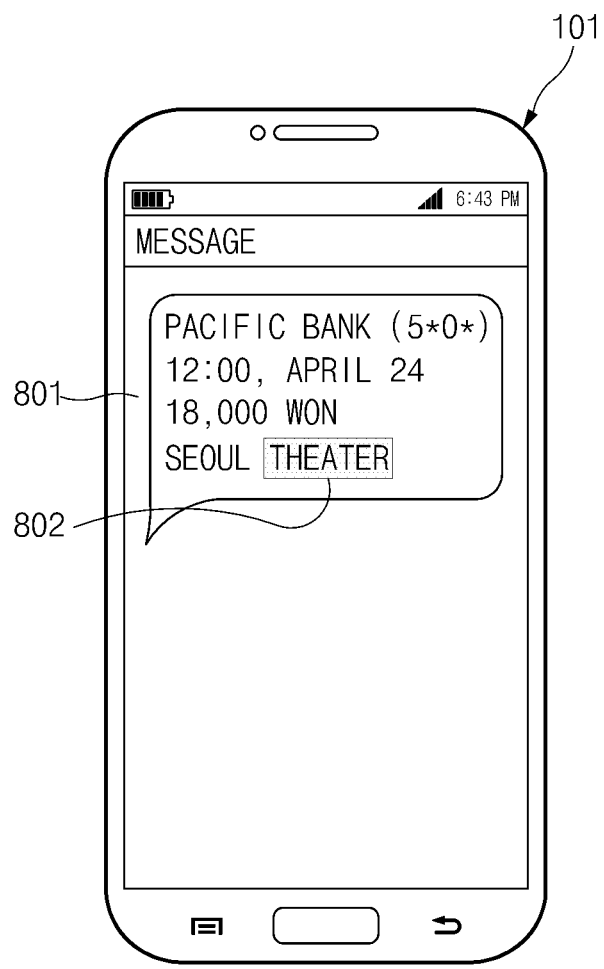
FIGS. 8A and 8B are screens showing a method of generating a schedule through a text message according to an embodiment of the present invention.
Figure 8B:
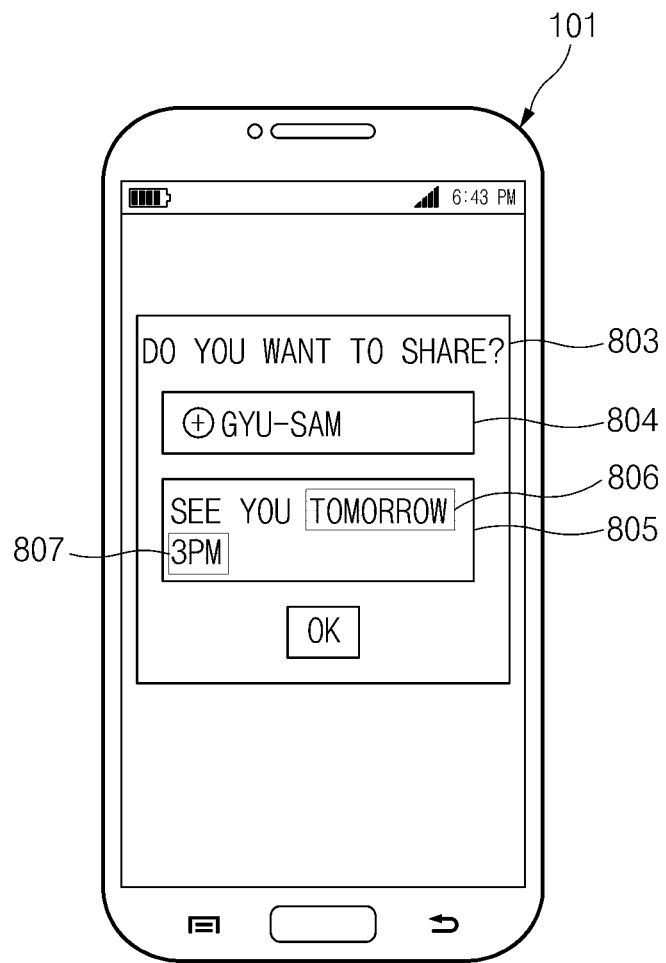

FIGS. 8A and 8B are exemplary screens showing a method of generating a schedule through a text message according to an embodiment of the present invention.

Referring to FIGS. 1, 5, 8A, and 8B, words and mnemonics such as "movie theater," "movie," "play," "opera," "CGV," "cinema," "theater," "library" may be set as reference words on a setting screen such as FIG. 5 and a "TEXT MESSAGE" (e.g. a message application) may be set as a "SCHEDULE CHECK APP." According to an embodiment of the present invention, a text message 801 received by a server (not shown) may be displayed as shown in FIG. 8A, when a user of the electronic device 101 pays for a movie by credit card. The electronic device 101 monitors a received text message to check that the text message includes at least one reference word. For example, the electronic device 101 may display a popup message 803 for sharing the text message 801 with another user as shown in FIG. 8B, when the text message includes the same word 802 as a reference word.

The electronic device may obtain tagging to another user 804 to share the text message 801 through the popup message 803 from a user and obtain a message 805 including a date and a time. The user may select the name of a user of the other electronic device 104 pre-stored in the phone book of the electronic device 101 to tag user name "GYU-SAM" as the other user 804. The user may tag the other user to a schedule by adding information on the other user to a region to which a companion is tagged, when information on the telephone number, e-mail address, or chatting ID of the other user to be tagged has not been stored in the electronic device 101 such as a phone book.

The electronic device 101 transmits the text message 801 and the message 805 input through the popup message 803 to the other electronic device 104 for the other user 804 tagged to the popup message 803, when the user presses the "OK" button. The electronic device 101 parses the message 805 to generate a schedule. The electronic device 101 may extract a date related word such as "TOMORROW" 806 from the message 805 and extract a time related word such as "3 PM" 807. The electronic device 101 uses extracted words to generate a schedule that corresponds to "GYU-SAM", "4/25", "3 PM" and "SEOUL THEATER".

Figure 9:
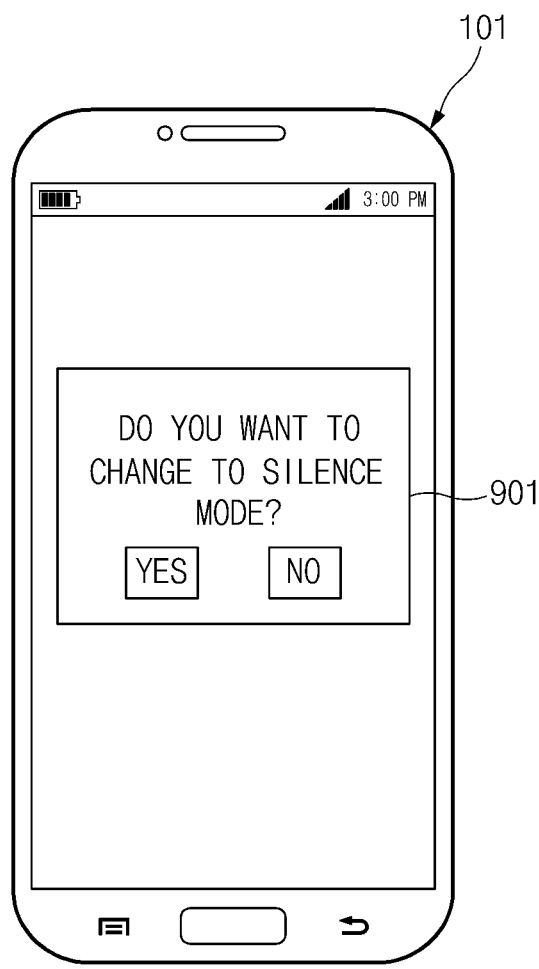
FIG. 9 is a screen showing a method of changing an alarm mode according to an embodiment of the present invention.

FIG. 9 is a screen showing a method of changing an alarm mode according to an embodiment of the present invention.

Referring to FIGS. 1, and 5 to 9, the electronic device 101 checks that the "SET ALARM MODE" menu 501 is set as a user check on a setting screen of FIG. 5 and a schedule generated in FIGS. 6A to 8B has arrived. The electronic device 101 displays a popup message 901 for changing an alarm as shown in FIG. 9. The electronic device 101 also displays the popup message 901, when the schedule generated in FIGS. 6A to 8B arrives and the electronic device 101 and is located at a location equal, or similar, to that set in FIGS. 6A to 8B. The electronic device 101 changes the alarm mode of the electronic device 101 to a silence mode when the "YES" button is pressed by a user, and the electronic device 101 maintains the current alarm mode when the "NO" button is pressed.

The electronic device 101 changes the alarm mode to the silence mode and transmits an alarm mode change triggering message to the other electronic device 104 that is included in a schedule generated in FIGS. 6A to 8B. According to an embodiment of the present invention, when a chatting message is transmitted to, and received from, a chat partner "GYU-SAM" by using a messenger as shown in FIGS. 6A and 6B, it is possible to create and transmit a triggering message for changing the alarm mode of the other electronic device 104 used by the chat partner "GYU-SAM" to a silence mode. According to an embodiment of the present invention, when the chat partner "GYU-SAM" is tagged to a schedule generated by a user as shown in FIG. 7, the electronic device 101 transmits the triggering message to the other electronic device 104 used by the chat partner "GYU-SAM." According to an embodiment of the present invention, when a movement payment history message is shared with the chat partner "GYU-SAM" as shown in FIG. 8B, the electronic device 101 transmits the triggering message to the other electronic device 104 used by the chat partner "GYU-SAM."

The electronic device 101 checks external environment information provided by the sensor module 140 after the change of the alarm mode. The electronic device 101 checks the external environment information such as an illumination level or a decibel level (hereinafter, referred to as "first external environment information") after the change of the alarm mode for a critical time. The electronic device 101 returns to the alarm mode before the change of the alarm mode, when the difference between an illumination level and the first external environment information is equal to or greater than a critical value after the time elapses. The electronic device 101 returns to the alarm mode before the change of the alarm mode, when the electronic device 101 is located farther than a critical range from the same, or similar, location to that set in FIGS. 6A to 8B. The electronic device 101 returns to the alarm mode before the change of the alarm mode, when a time at which a schedule ends is input as shown in FIG. 7 and the end time arrives irrespective of external environment information.

When the "SET ALARM MODE" menu 501 on the setting screen of FIG. 5 is set to "AUTOMATIC CHANGE", the electronic device 101 automatically changes the alarm mode to a silence mode when a schedule generated in FIGS. 6A to 8B arrives.

According to an embodiment of the present invention, the electronic device 101 accumulates the number of times that the "NO" button is pressed on the popup message 901. The electronic device 101 may not automatically change the alarm mode where the number of times the "NO" button is pressed on the same place is equal to or greater than a critical value even though the alarm mode setting menu 501 is set to "AUTOMATIC CHANGE".

According to an embodiment of the present invention, the electronic device 101 accumulates the number of times that the "YES" button is pressed on the popup message 901. The electronic device 101 may not automatically change the alarm mode where the number of times the "YES" button is pressed on the same place is equal to or greater than a critical value even though the alarm mode setting menu 501 is set to "USER CHECK" or "NO CHANGE".

Figure 10:
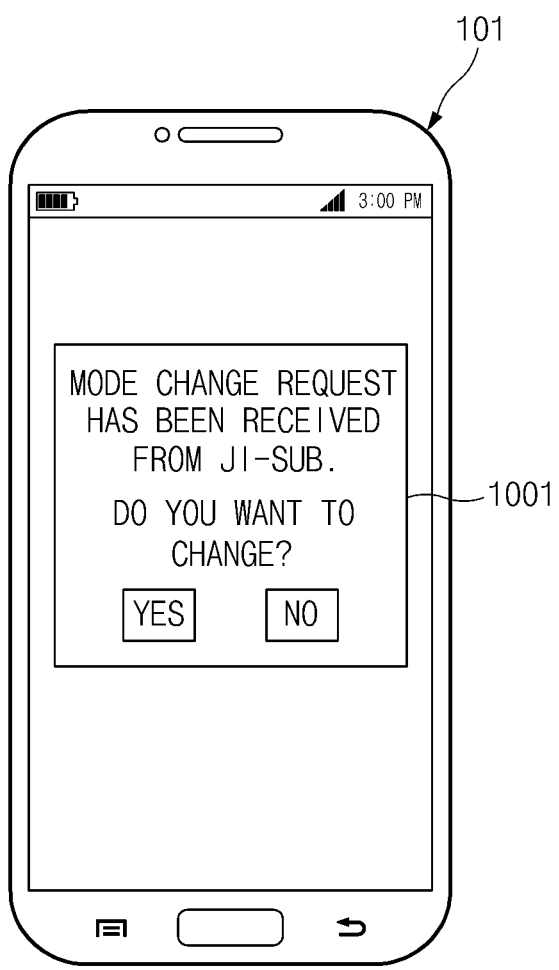
FIG. 10 is a screen showing an alarm mode change triggering message received from another electronic device according to an embodiment of the present invention.

FIG. 10 is a screen representing an alarm mode change triggering message received from another electronic device according to an embodiment of the present invention.

Referring to FIGS. 1, 5, and 10, while a recommendation on the "SET ALARM MODE" menu 501 of FIG. 5 is set, it is possible to display a popup box 1001 displaying an alarm mode change triggering message received from the other electronic device 104 on the display 160. The electronic device 101 performs a change to the same alarm mode as the changed alarm mode of the other electronic device 104 for another user, "JI-SUB" that has transmitted the triggering message, when the "YES" button is pressed by a user. In this case, the user name "JI-SUB" displayed on the popup box may be pre-stored in the phone book of the electronic device 101. The electronic device 101 maintains the currently set alarm mode, when the "NO" button is pressed by a user.

Figure 11:
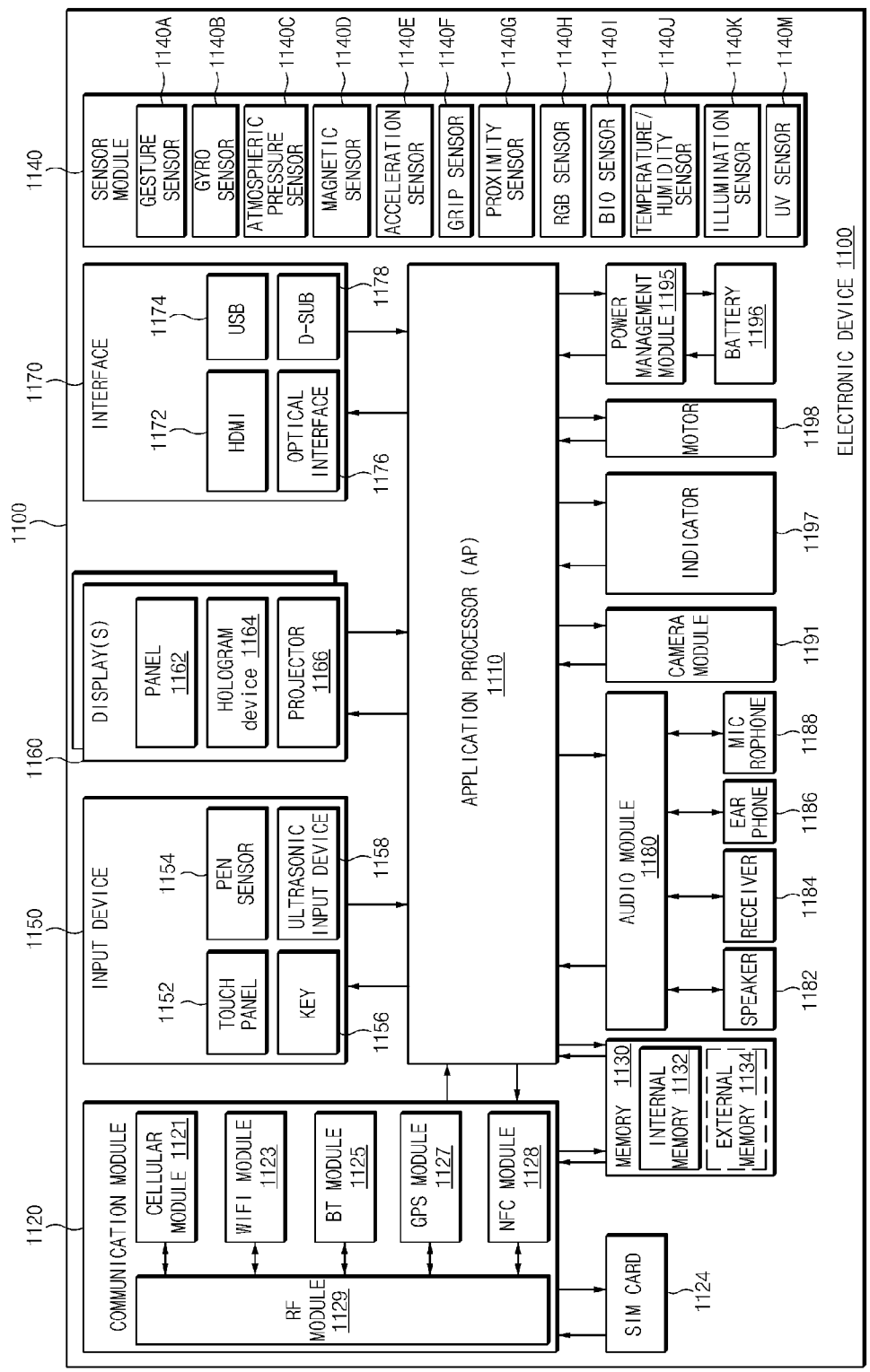
FIG. 11 is a block diagram showing an electronic device according to an embodiment of the present invention.

FIG. 11 is a block diagram showing an electronic device according to an embodiment of the present invention.

Referring to FIG. 11, an electronic device 1100 according to an embodiment of the present invention may include a whole or a portion of the electronic device 101 as shown in FIG. 1. The electronic device 1100 includes one or more application processors (APs) 1110, a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110, such as a processor 120 as shown in FIG. 1, executes an operating system or an application program to control a plurality of hardware and software components connected to the AP 1110 and performs processing and calculations on various pieces of data including multimedia data. The AP 1110 may be implanted as a System on Chip (SoC) for example. According to an embodiment of the present invention, the AP 1110 may further include a Graphics Processing Unit (GPU) (not shown).

The AP 1110 performs the function of the control module 180 as shown in FIG. 1, for example. The AP 1110 extracts schedule related information from text data and changes an alarm mode according to extracted schedule related information. The AP 1110 creates a triggering message for triggering the change of the alarm mode of another electronic device that is included in the schedule related information.

The communication module 1120, such as a communication interface 170 as shown in FIG. 1, performs data transmission and reception when there is communication between the electronic device 1100 (e.g., the electronic device 101) and other electronic devices connected thereto through a network. According to an embodiment of the present invention, the communication module 1120 includes a cellular module 1121, a WiFi module 1123, a BT module 1125, a GPS module 1127, an NFC module 1128, and a Radio Frequency (RF) module 1129.

The cellular module 1121 provides a voice call, a video call, a message service, or a web service through a communication network (such as an LTE, LTE-A, CDMA, WCDMA, UMTS, WiBro or GSM network). Also, the cellular module 1121 uses, for example, a Subscriber Identity Module (SIM) card 1124 to perform the identification and authentication of an electronic device in a communication network. According to an embodiment of the present invention, the cellular module 1121 performs at least some of the functions that the AP 1110 provides. For example, the cellular module 1121 may perform at least some multimedia control functions.

According to an embodiment of the present invention, the cellular module 1121 includes a communication processor (CP). Also, the cellular module 1121 may be implemented in a SoC, for example. FIG. 11 shows components such as a cellular module 1121 (such as a communication processor), a memory 1130 and a power management module 1195 separately from the AP 1110, but, according to an embodiment of the present invention, the AP 1110 may be implemented to include at least some (such as a cellular module 1121) of the above-described components.

According to an embodiment of the present invention, the AP 1110 or the cellular module 1121 (such as a communication processor) loads, on volatile memories, commands or data received from at least one of a non-volatile memory connected thereto or to another component, and processes the commands or data. Also, the AP 1110 or the cellular module 1121 stores, on non-volatile memories, data received from at least one other component or generated by at least one other component.

Each of the WiFi module 1123, the BT module 1125, the GPS module 1127 and the NFC module 1128 include a processor for processing data transmitted and received through a corresponding module, for example. FIG. 11 shows each of the cellular module 1121, the WiFi module 1123, the BT module 1125, the GPS module 1127, and the NFC module 1128 as separate blocks, but according to an embodiment of the present invention, at least some (e.g., two or more) of the cellular module 1121, the WiFi module 1123, the BT module 1125, the GPS module 1127, and the NFC module 1128 may be included in one integrated circuit, or chip, (IC) or an IC package. For example, at least some (such as a communication processor corresponding to the cellular module 1121 and a WiFi processor corresponding to the WiFi module 1123) of the processors corresponding to the cellular module 1121, the WiFi module 1123, the BT module 1125, the GPS module 1127, and the NFC module 228, may be implemented in one SoC.

The RF module 1129 performs data transmission and reception, such as RF signal transmission and reception. The RF module 1129 may include e.g., a transceiver, a Power Amp Module (PAM), a frequency filter or a Low Noise Amplifier (LNA) though not shown. Also, the RF module 1129 may further include a conductor or wire for transmitting or receiving electromagnetic waves in free space when performing wireless communication. Although FIG. 11 shows that the cellular module 1121, the WiFi module 1123, the BT module 1125, the GPS module 1127, and the NFC module 1128 share one RF module 1129, at least one of the cellular module 1121, the WiFi module 1123, the BT module 1125, the GPS module 1127, and the NFC module 1128 may transmit and receive an RF signal through a separate RF module according to an embodiment of the present invention.

The SIM card 1124 is a card that includes a Subscriber Identification Module and may be inserted into a slot that is formed on a part of an electronic device. The SIM card 1124 may include unique identification information (such as an Integrated Circuit Card Identifier (ICCID)) or subscriber information (such as an International Mobile Subscriber Identity (IMSI)). The SIM card 1124 stores an alarm mode change application that is received from an external device. The SIM card (1124) stores text data. The text data may be included in a text message, a chatting message or an e-mail message that is transmitted and received by an application enabling message transmission and reception to and from an external device. The text data may be included in data input from a user by using an application that may input the data. The SIM card (1124) stores information on another electronic device. Information on the other electronic device may include a telephone number, a chatting ID, and an e-mail address. The text data may be generated in such a manner that a text image on image data included in the text message, the chatting message, the e-mail message and data is converted by an optical character reader (OCR). To this end, the SIM 1124 may store an OCR conversion program.

The memory 1130, such as a memory 130 in FIG. 1, may include an internal memory 1132 and an external memory 1134. The internal memory 1132 may include at least one of e.g., a volatile memory (such as a Dynamic Random Access Memory (RAM) (DRAM), a Static RAM (SRAM), or a Synchronous Dynamic RAM (SDRAM)) and a non-volatile memory (such as a One Time Programmable Read Only Memory (ROM) (OTPROM), a programmable ROM (PROM), an Erasable and Programmable ROM (EPROM), an Electrically Erasable and Programmable ROM (EEPROM), a mask ROM, a flash ROM, a NOT-AND (NAND) flash memory, or a NOT-OR (NOR) flash memory). The memory 1130 stores an alarm mode change application that is received from an external device. The memory (1130) store text data. The text data may be included in a text message, a chatting message or an e-mail message that is transmitted and received by an application enabling message transmission and reception to and from an external device. The text data may be included in data input from a user by using an application that may input the data. The memory (1130) may store information on another electronic device. Information on the other electronic device may include a telephone number, a chatting ID, and an e-mail address. The text data may be generated in such a manner that a text image on image data included in the text message, the chatting message, the e-mail message and data is converted by an optical character reader (OCR). To this end, the memory 1130 may store an OCR conversion program.

According to an embodiment of the present invention, the internal memory 1132 may be a Solid State Drive (SSD). The external memory 1134 may further include a flash drive, such as a Compact Flash (CF) drive, a Secure Digital (SD) drive, a micro Secure Digital (micro-SD) drive, a mini Secure Digital (mini-SD) drive, or an eXtreme Digital (xD) drive, or a memory stick. The external memory 1134 is functionally connected to the electronic device 1100 through various interfaces. According to an embodiment of the present invention, the electronic device 1100 may further include a storage device (or storage medium) such as an Hard Disk Drive (HDD).

The sensor module 1140, such as a sensor module 140 in FIG. 1, measures a physical quantity, senses the operation state of the electronic device 1100 and converts measured or sensed information into an electrical signal. The sensor module 1140 may include at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a Red, Green, Blue (RGB) color sensor 1140H, a bio sensor 1140I, a temperature/humidity sensor 1140J, an illumination sensor 1140K or a Ultra Violet (UV) sensor 1140M, for example. Additionally or alternatively, the sensor module 1140 may include an Electronic nose (E-nose) sensor (not shown), an ElectroMyoGraphy (EMG) sensor (not shown), an ElectroEncephaloGram (EEG) sensor (not shown), an ElectroCardioGram (ECG) sensor (not shown), an InfraRed (IR) sensor (not shown), an iris sensor or a fingerprint sensor (not shown). The sensor module 1140 may further include a control circuit for controlling at least one sensor that is included in the sensor module 1140. The sensor module 1140 uses the gyro sensor 1140B to sense the rotation of the electronic device 1100, and convert the information into an electrical signal to provide the AP 1110 with the electrical signal.

The input device 1150, such as an input module 120 in FIG. 1, may include a touch panel 1152, a (digital) pen sensor 1154, a key 1156 or an ultrasonic input device 1158. The touch panel 1152 recognizes a touch input by using at least one of capacitive, pressure-sensitive, infrared or ultrasonic techniques, for example. Also, the touch panel 1152 may also further include a control circuit. In the case of the capacitive technique, a physical contact or proximity awareness is possible. The touch panel 1152 may also further include a tactile layer. In this case, the touch panel 1152 provides a user with a tactile response.

The (digital) pen sensor 1154 may be implemented by using the same, or similar, method as that of obtaining a user's touch input or by using a separate sheet for recognition, for example. The key 1156 (e.g., the input module 120) may include a physical button, an optical key or keypad, for example. The ultrasonic input device 1158 senses a sound wave via a microphone from the electronic device 1100 and check data, through an input tool generating an ultrasonic signal, and the ultrasonic input device 1158 may thus perform wireless recognition. According to an embodiment of the present invention, the electronic device 1100 may also use the communication module 1120 to receive a user input from an external device (such as a computer or server) connected thereto.

The display 1160, such as a display 160 in FIG. 1, may include a panel 1162, a hologram device 1164, or a projector 1166. The panel 1162 may be a Liquid-Crystal Display (LCD) or an Active-Matrix Organic Light-Emitting Diode (AM-OLED), for example. The panel 1162 may be implemented flexibly, transparently or wearably, for example. The panel 1162 and the touch panel 1152 may also be implemented in one module. The hologram device 1164 may use the interference of light to show a stereoscopic image in the air. The projector 1166 projects light onto a screen to display an image. The screen may be located internal or external to the electronic device 1100. According to an embodiment of the present invention, the display 1160 may further include a control circuit for controlling the panel 1162, the hologram device 1164 or the projector 1166.

The interface 1170 may include a High-Definition Multimedia Interface (HDMI) 1172, a Universal Serial Bus (USB) 1174, an optical interface 1176 or a D-subminiature (D-sub) connector 1178, for example. Additionally or alternatively, the interface 1170 may include a Mobile High-definition Link (MHL) interface, an SD card/Multi-Media Card (MMC) interface or an Infrared Data Association (IrDA) interface, for example.

The audio module 1180 converts sound into an electrical signal and vice versa. The audio module 1180 processes sound information input or output through a speaker 1182, a receiver 1184, an earphone 1186 or the microphone 1188, for example.

The camera module 1191 is a device that captures still pictures and moving pictures, and according to an embodiment of the present invention, it is possible to include one or more image sensors (such as a front sensor or rear sensor), lens (not shown), an Image Signal Processor (ISP, not shown), or a flash (not shown) (e.g., a Light Emitting Diode (LED) or a xenon lamp).

The power management module 1195 manages the power of the electronic device 1100. Although not shown, the power management module 1195 may include a Power Management Integrated Circuit (PMIC), a charger IC, or a battery or fuel gauge, for example.

The PMIC may be included in an IC or a SoC semiconductor, for example. Charging techniques may be classified into wired and wireless techniques. The charger IC may charge a battery and prevent overvoltage or overcurrent from a charger. According to an embodiment of the present invention, the charger IC may include a charger IC for at least one of a wired charging technique and a wireless charging technique. The wireless charging technique includes, for example, a magnetic resonance type, a magnetic induction type, or an electromagnetic wave type, and an additional circuit for wireless charging may be added such as a coil loop, a resonance circuit, or a rectifier.

The battery gauge may measure the level, current or temperature of the battery 1196, or the voltage of the battery 1196 during charging, for example. The battery 1196 may store or generate electricity and use stored or generated electricity to supply power to the electronic device 1100. The battery 1196 may include a rechargeable battery or a solar battery, for example.

The indicator 1197 shows the states of the electronic device 1100 or a portion (e.g., the AP 1110) of the electronic device 1100, such as a booting state, a message state or a charged state. The motor 1198 converts an electrical signal into mechanical vibration. Although not shown, the electronic device 1100 may include a processing device (e.g., a GPU) for supporting a mobile TV. The processing device for supporting the mobile TV may process media data according to a standard such as Digital Multimedia Broadcasting (DMB), Digital Video Broadcasting (DVB) or media flow.

Each of the above-described elements of the electronic device according to the present invention may include one or more components and the names of corresponding elements may vary depending on the type of an electronic device. The electronic device according to the present invention may include at least one of the above-described elements and some elements may be left out or other elements may be further included. Also, some of the elements of the electronic device according to the present invention are combined to form an entity, which may equally perform the functions of corresponding elements before being combined.

The term "module" used in the present invention may mean a unit including one of hardware, software and firmware or a combination of two or more thereof, for example. The "module" may be interchangeably used with the term "unit", "logic", "logical block", "component", or "circuit", for example. The "module" may be an elementary unit, or a portion, of an integral component. The "module" may also be an elementary unit for performing one or more functions or a portion of the elementary unit. The "module" may be implemented mechanically or electronically. For example, the "module" according to the present invention may include at least one of an Application-Specific Integrated Circuit (ASIC) chip, a Field-Programmable Gate Array (FPGA) and a Programmable-Logic Device (PLD) performing some operations that have been known or will be developed.

According to various embodiments, at least some of devices (such as modules or their functions) or methods (such as steps) according to the present invention may be implemented as commands stored in a non-transitory computer-readable storage medium in the form of a programming module, for example. When the command is executed by one or more processors, the one or more processors may execute a function corresponding to the command. The non-transitory computer-readable storage medium may be a memory, for example. At least a portion of the programming module may be implemented (e.g., performed) by a processor, for example. At least a portion of the programming module may include, for example, a module, a program, a routine, a set of instructions or a process for executing one or more functions.

In a non-transitory computer-readable storage medium that has a command capable of controlling the operation of the electronic device 101 according to an embodiment of the present invention, the command may enable the electronic device to extract schedule related information from text data, to change an alarm mode according to the schedule related information, and to generate a triggering message for triggering the change of the alarm mode of at least another electronic device included in the schedule related information to transmit the message to the at least one another electronic device.

In a non-transitory computer-readable storage medium that has a command capable of controlling the operation of the electronic device 101 according to an embodiment of the present invention, the command may enable the electronic device 101 to receive an alarm mode change triggering message from another electronic device 104 and to change an alarm mode to be equal to the alarm mode of the other electronic device 104 according to the alarm mode change triggering message.

As described above, the electronic device and method for changing an alarm mode according to various embodiments of the present invention may analyze text data included in an electronic device to check a schedule, and change the alarm mode of the electronic device according to the schedule to minimize the inconvenience imposed on a user who has to change an alarm mode manually.

The electronic device and method for changing an alarm mode according to various embodiments of the present invention may provide another electronic device included in a schedule with a message during the change of the alarm mode of an electronic device, so it is possible to trigger the change of the alarm mode of the other electronic device.

The non-transitory computer-readable recording medium may include a magnetic medium such as a hard disk, a floppy disk and a magnetic tape, an optical medium such as a Compact Disc Read Only Memory (CD-ROM) and a Digital Versatile Disc (DVD), a magneto-optical medium such as a floptical disk, and a hardware device that is especially configured to store and execute a program command (such as a programming module), such as a Read Only Memory (ROM), a Random Access Memory (RAM), and a flash memory. Also, the program command may include a machine code made by a compiler as well as a high-level language code that may be executed by a computer by using an interpreter. The above-described hardware device may be configured to operate by one or more software modules to execute the operations of the present invention and vice versa.

The module or programming module according to the present invention may include at least one of the above-described elements, leave out some elements or further include other elements. Operations executed by a module according to the present invention, a programming module or another element may be executed by using a sequential, parallel, repetitive or heuristic method. Also, the execution order of some steps may vary, some steps may be left out or further steps may be added.

In addition, embodiments of the present invention disclosed in the specification and the drawings only present examples to easily describe the technical details of the present invention and help to understand the present invention and are not intended to limit the scope of the present invention. Thus, it should be construed that all changed or modified forms derived from the technical spirit of the present invention in addition to the disclosed embodiments are included in the scope of the present invention as defined by the appended claims and their equivalents.

What is claimed is:

1. An electronic device, comprising:
   a control module configured to extract schedule related information from text data, change an alarm mode of the electronic device according to extracted schedule related information and create a triggering message for triggering the change of an alarm mode of at least another electronic device associated with the schedule related information; and
   a communication interface configured to transmit the triggering message to the at least another electronic device.

2. The electronic device according to claim 1, wherein the schedule related information includes date information, time information, and place information.

3. The electronic device according to claim 2, wherein the control module is further configured to check state information that includes a current date, a current time and a current location.

4. The electronic device according to claim 3, wherein the control module is further configured to change the alarm mode of the electronic device when the current date is equal to the date information, the current time is equal to the time information or within a user-defined time, and the current location is equal to the place information or within a user-defined range.

5. The electronic device according to claim 2, wherein the control module is further configured to extract the schedule related information from a message transmitted to, and received from, the at least another electronic device via a chatting application, a message application, and an e-mail application.

6. The electronic device according to claim 5, wherein the control module is further configured to check information on the at least another electronic device.

7. The electronic device according to claim 2, wherein the control module is further configured to extract the schedule related information from data input via an application that includes a scheduler, a diary and a note pad.

8. The electronic device according to claim 7, wherein the control module is further configured to check information on the at least another electronic device that is tagged to the data.

9. The electronic device according to claim 1, further comprising a sensor module configured to sense external environment information that includes location information, an illumination level, and a decibel level.

10. The electronic device according to claim 9, wherein the control module is further configured to return to the previous alarm mode of the electronic device according to the external environment information after a change of the alarm mode of the electronic device.

11. The electronic device according to claim 1,
wherein the communication interface is further configured to communicate with another electronic device, and
wherein the control module is further configured to change the alarm mode of the electronic device to be equal to the alarm mode of the at least another electronic device according to an alarm-mode-change-triggering message received from the at least another electronic device.

12. A method of changing an alarm mode, the method comprising:
extracting schedule related information from text data;
changing an alarm mode of an electronic device according to the schedule related information; and
generating a triggering message for triggering a change of an alarm mode of at least another electronic device included in the schedule related information, and transmitting the triggering message to the at least another electronic device.

13. The method according to claim 12, wherein extracting schedule related information from text data comprises extracting the schedule related information from a message transmitted to, and received from, the at least another electronic device via a chatting application, a message application, and an e-mail application.

14. The method according to claim 13, wherein extracting schedule related information from text data further comprises checking information on the at least another electronic device that transmits and receives the message.

15. The method according to claim 12, wherein extracting schedule related information from text data comprises extracting the schedule related information from data input via an application that includes a scheduler, a diary and a note pad.

16. The method according to claim 15, wherein extracting schedule related information from text data further comprises checking information on the at least another electronic device that is tagged to the data.

17. The method according to claim 12, further comprising, after transmitting the message to the at least another electronic device:
sensing external environment information including location information, an illumination level, and a decibel level; and
returning to the previous alarm mode of the electronic device according to the external environment information.

18. The method according to claim 12, further comprising,
receiving an alarm-mode-change-triggering message from the at least another electronic device; and
changing the alarm mode of the electronic device to be equal to the alarm mode of the at least another electronic device according to the alarm-mode-change-triggering message.

* * * * *